United States Patent [19]

Toki et al.

[11] 4,044,540

[45] Aug. 30, 1977

[54] ELASTOMER COATED CARBON FILAMENT REINFORCING YARN OR CORD, METHOD AND ARTICLE

[75] Inventors: Masamichi Toki; Noriaki Kusatsu; Yoshio Kohno, all of Okazaki; Kenji Matsugasako, Otsu, all of Japan

[73] Assignee: Toray Industries, Inc., Tokyo, Japan

[21] Appl. No.: 663,859

[22] Filed: Mar. 4, 1976

[51] Int. Cl.² .......................... D02G 3/36; D02G 3/40; D02G 3/48

[52] U.S. Cl. ........................................ 57/153; 57/164; 428/378

[58] Field of Search .................... 57/153, 140 C, 164; 428/367, 375, 378; 152/356, 359

[56] References Cited

U.S. PATENT DOCUMENTS

| | | | |
|---|---|---|---|
| 3,620,817 | 11/1971 | Celentano | 428/375 X |
| 3,648,452 | 3/1972 | Young | 57/164 |
| 3,748,291 | 7/1973 | Bhakuni et al. | 57/153 X |
| 3,803,035 | 4/1974 | Bhakuni et al. | 57/164 X |
| 3,914,504 | 10/1975 | Weldy | 428/367 |

*Primary Examiner*—Richard C. Queisser
*Assistant Examiner*—Charles Gorenstein

[57] ABSTRACT

Multi-filament reinforcing carbon yarn coated with a resorcinol-formaldehyde-latex (RFL) composition for use in reinforced rubber articles such as tires. The reinforcing yarn is prepared from a multi-filament carbon yarn having a limited denier of about 500–4,000, having a twist factor of the yarn of about 0–250, and having individual filaments which have a denier of 1.4–2.0. The reinforcing yarn is impregnated with RFL, so that the amount of coated RFL is at least about 10 weight percent based on the yarn. Treatment of the carbon filament yarn with an epoxy resin, prior to being subjected to impregnation with RFL, is also disclosed.

13 Claims, No Drawings

ELASTOMER COATED CARBON FILAMENT REINFORCING YARN OR CORD, METHOD AND ARTICLE

FIELD OF THE INVENTION

This invention relates to an improved reinforcing yarn or cord coated with a resorcinol-formaldehyde-latex (RFL). The yarn or cord is prepared from at least one multi-filament yarn of carbon. This invention further relates to a method for manufacture of a reinforcing yarn or cord, and still further relates to a pneumatic tire, reinforced with a reinforcing yarn or cord according to this invention.

DESCRIPTION OF THE PRIOR ART

Reinforcing yarns or cords have been prepared from cotton, rayon, nylon, polyester, steel or glass for use in rubber articles, particularly in dynamic rubber articles such as pneumatic tires and the like. They are well known and widely used commercially for reinforced rubber articles In recent years a multi-filament yarn of carbon having high modulus, high tenacity, good dimensional stability, good heat resistance and good chemical resistance has been produced commercially. Reinforcing yarns of cords prepared from a bundle of carbon filaments has been proposed by A. M. Young in U.S. Pat. No. 3,648,452. This reference discloses yarns or cores for reinforcing use, which yarns or cords comprise a large number of carbon filaments coated with an elastic solid having a specific Poisson's ratio, and having characteristics which overcome the problem that the breaking extension of carbon filaments is so small that the realized strength in a yarn or a cord of multi-filament is far smaller than that of the original fibers.

On the other hand it is highly desirable that a reinforcing yarn coated with an elastomer for use in dynamic rubber articles should have a high tenacity, for example at least 7 grams per denier. It should also have good fatigue resistance. There has long been a need for reinforcing yarn having a tenacity of at least about 7 grams per denier and good fatigue resistance, wherein the yarn is coated with an elastomer and is prepared from at least one multi-filament yarn of carbon. It has been experienced that reinforcing yarns or cords manufactured by impregnating a bundle of carbon filaments having a large total denier (such as about 20,000) with a RFL have not possessed high tenacity, particularly a tenacity not less than 7 grams per denier. This is true even if the individual carbon filaments commercially produced have a tenacity of not less than 1 grams per denier, as illustrated in Comparative Examples $C_1$–$C_4$ as hereinafter described.

An object of this invention is to provide a novel reinforcing yarn coated with a RFL wherein the yarn is formed from a multi-filament carbon yarn having a tenacity of at least about 7 grams per denier, and also has good fatigue resistance.

Another object of this invention is to provide a method for manufacturing a RFL coated-reinforcing yarn comprising a multi-filament yarn of carbon wherein the RFL coated reinforcing yarn has a tenacity of at least about 7 grams per denier and also has good fatigue resistance.

Other objects and advantages of this invention will become further apparent from the following description.

SUMMARY OF THE INVENTION

The method according to this invention is capable of producing reinforcing yarn having a tenacity of at least about 7 grams per denier and comprises: (A) preparing an original multi-filament yarn of carbon which is to be subjected to coating with an elastomer, said yarn having a denier in the range of from about 500 to about 4,000, a twist factor in the range of from 0 to about 250 and a denier per filament in the range of from about 0.4 to 2.0, (B) impregnating the original multi-filament carbon yarn with a liquid medium containing a resorcinol-formaldehyde-latex (RFL) composition, (C) adjusting the amount of pick-up of the liquid so that after subsequently being dried, the amount by weight of the resorcinol-formaldehyde-latex composition encapsulating the multi-filament yarn becomes equivalent to at least about 10% by weight of the weight of the multi-filament yarn, and (D) during the multi-filament yarn to encapsulate it with the solidified resorcinol-formaldehyde-latex (RFL) composition.

In the method according to this invention, the limitations of total denier, denier per filament and twist factor of the original multi-filament carbon yarn are important, and serve to provide an elastomer coated carbon filament reinforcing yarn having a tenacity of at least about 7 grams per denier. Where the total denier is more than about 4,000, the tenacity and fatigue resistance of the coated yarn rapidly decrease, even if the denier per filament is in the range of from about 0.4 to 2.0. Where the denier per filament is less than about 0.4, the tenacity and fatigue resistance of the coated yarn decrease, even if the total denier is in the range of from about 500 to about 4,000. Further, when the twist factor of the original multi-filament carbon yarn is more than about 250, the tenacity and fatigue resistance of the coated yarn also decrease because of insufficient impregnation of the liquid containing RFL composition between the filaments of the original carbon yarn. It is preferable that the twist factor of the yarn be in the range of from about 20 to about 200 in accordance with this invention.

The weight of RFL encapsulating the multi-filament carbon yarn should be controlled to at least about 10% by weight of the weight of the multi-filament yarn. This is also one of the necessary limitations for obtaining a coated yarn having a tenacity of at least about 7 grams per denier.

According to this invention, the method for manufacture of a carbon filament reinforcing yarn having a tenacity of at least about 7 grams per denier, and having good adhesion to rubber, comprises: (A) preparing an original multi-filament carbon filament yarn, subjecting it to coating with an elastomer having a denier in the range of from about 500 to about 4,000, a twist factor in the range of 0 to about 250, a denier per filament in the range of from about 0.4 to 2.0, (B) impregnating the original multi-filament carbon yarn with a liquid medium containing an epoxy resin, (C) adjusting the amount of pick-up of the liquid so that upon subsequently being dried, the amount by weight of the epoxy resin encapsulating the multi-filament yarn becomes equivalent to the range of about 0.5% to 10% by weight of the multi-filament yarn, (D) drying the multi-filament yarn to encapsulate the multi-filament yarn within the epoxy resin, (E) impregnating the multi-filament yarn coated with the epoxy resin with a liquid medium containing a resorcinol-formaldehyde-latex (RFL) composition, (F) adjusting the amount of pick-up of the liquid so that after subsequently being dried, the amount by weight of the resorcinol-formaldehyde-latex composition encapsulating the multi-filament yarn becomes equivalent to at least about 10% by weight of the multi-filament yarn, and (G) drying the multi-filament yarn to encapsulate it with the solidified resorcinol-formaldehyde-latex composition.

The treatment of the original yarn with the epoxy resin before impregnation with the RFL composition in accordance with this invention is effective for increasing the adhesion of the coated yarn to rubber. The weight of the epoxy resin coating the multi-filament yarn should be limited to the range of from about 0.5 to 10% by weight of the multi-filament yarn. Where this weight is over about 10%, impregnation of the RFL into the spaces between filaments of the multi-filament yarn becomes difficult. The weight of the epoxy resin coating the multi-filament yarn is preferably in the range of from about 1% to 6% by weight of the multi-filament yarn.

According to this invention a method for manufacture of a reinforcing yarn having a tenacity of at least about 7 grams per denier and good adhesion to rubber, and further having good fatigue resistance, involves the use of a water-soluble epoxy resin.

Using a water soluble epoxy resin brings about an increase of fatigue resistance of the RFL coated yarn, and is also effective in making possible the impregnation (easily and uniformly) of a large amount of RFL between the filaments of the multi-filament yarn.

The resorcinol-formaldehyde-latex composition, which is known as an adhesive composition comprising a mixture of a condensate of resorcinol and formaldehyde and a rubber latex which comprises, for example, one or more rubber latices selected from the group consisting of natural rubber latex, polychloroprene latex, polybutadiene latex, styrene-butadiene copolymer latex, acrylonitrile-butadiene copolymer latex and vinylpyridine-styrene-butadiene terpolymer latex. With respect to the RFL composition, a weight ratio based on solid condensate of resorcinol-formaldehyde (RF) to latex (L) in the range of from about 1 to 10 is used preferably in accordance with this invention, more preferably about 2 to 9. The liquid containing RFL in this invention may be prepared in the usual manner. With respect to the drying condition for the multi-filament yarn impregnated with the liquid containing the elastomer such as RFL, the temperature of the drying medium may be in the range of from about 150° C to 250° C, with the time of treating being in the range of from about 30 seconds to 2 minutes. These are preferable in the practice of this invention.

Epoxy resins suitable for use in this invention are compounds having at least one epoxy group, for example, an alkali treated reaction product of a polyhydroxy alcohol or polyhydroxy phenol and an epichlorohydrin. The polyhydroxy alcohol is preferably glycerin, ethylene glycol, diethylene glycol, propylene glycol, butylene glycol, polyvinyl alcohol, inositol, trimethylol propane or 1,4-dimethylol benzene. As the polyhydroxy phenol, it is preferably resorcinol, hydroquinone, bisphenol A, phloroglucinol or catechol. The liquid containing the epoxy resin in this invention is prepared by dissolving or emulsifying the epoxy resin in water or an organic solvent. The water soluble epoxy resin suitable for use in this invention is, for example, a reaction product obtained from the reaction of epichlorohydrin and at least one kind of polyol, for example glycerin, ethylene glycol, polyethylene glycol, propylene glycol polypropylene glycol, neopenthyl glycol, trimethylol propane, pentaerythritol, diglycerin or sorbitol. A polyglycidyl ether or diglycidyl ether of glycerin is most preferable. With respect to the drying conditions for the multi-filament yarn impregnated with the liquid containing the epoxy resin, this depends on the kind of epoxy resin applied but in general a milder condition should be adopted than the known condition of the treatment of polyester fiber coated with a liquid containing epoxy resin. For example, it is preferable to control the drying to a temperature at most about 200° C, more preferably in the range of from about 100° C to 180° C. When using a water soluble epoxy resin, it is preferred that the concentration of the epoxy in the liquid is in the range of about 1% to 30% by weight of the liquid.

The denier of the yarn, the multi-filament yarn, the individual filament or the cord encapsulated with the elastomer and/or the epoxy resin in this specification means the denier of each, not including the RFL and/or epoxy resin, that is, the denier of each taken alone.

The tenacity of the RFL coated multi-filament carbon yarn in this specification is determined as follows: An end of the RFL coated multi-filament yarn having a gauge length of 25 cm is taken as a sample for testing. The strength at break of the sample is measured by using a constant extension speed tension tester at an extension speed of 50 millimeters per minute under the rules described in JIS.L.1017. The tenacity is determined by dividing the observed value of strength by the denier of the yarn.

The tenacity of an individual filament of carbon in this specification is determined as follows: An individual filament of carbon is taken from the multi-filament yarn and a sample of this filament, having a gauge length of 20 millimeters, is taken from the single filament. The strength of the sample is measured by using a constant extension speed tension tested at an extension speed of 0.5 millimeter per minute. The tenacity of the individual filament is determined by dividing the observed value of strength by the denier of the individual filament.

The twist factor of a yarn or cord herein is determined as follows:

The twist factor of the yarn (the amount of ply twist in the yarn) equals (twist in turns per 10 cm in the yarn) $\times \sqrt{\text{denier of the yarn}}$.

The twist factor of the cords (which means the amount of cable twist in the cord) equals (twist in turns per 1 cm in the cord) $\times \sqrt{\text{denier of the cord}}$.

The weight of RFL or epoxy resin encapsulating the multi-filament carbon yarn of this invention is determined by the difference between the total weight of the coated yarn and the weight of the yarn just prior to coating.

The strength retention of compression flexing in accordance with this invention is determined as follows: The measurement is performed under the rules of the test B method (De Mattia method) described in JIS.L-1017. According to the rules set forth therein, the fatigue test is performed for one hour using a stroke of 25 mm using a rubber block test piece having sample yarns embedded therein, at a density in terms of numbers of yarns in the range of 18 per 25 mm. A notch is provided at the center of the piece. The strength values of the sample yarns, before and after performing the fatigue test, are measured and the strength retention of compression flexing is calculated from the strength values.

The extension and compression fatigue life in accordance with this invention is determined as follows: The fatigue life is shown in terms of a bending angle (degrees) and a running time (kilocycles) until rupture occurs. The test is conducted according to the procedure described in fatigue Test A (Goodyear method) stated in JIS.L-1017. For the test, preflexings of the test piece are performed for a running time of 1 minutes (8.5 kilocycles) at a bending angle of 10°, and next for a running time of 20 minutes (17 kilocycles) at a bending angle of 20°. After that, the main flexing procedure of the test piece is performed step by step for a running time of 30 minutes (25.5 kilocycles) respectively and changing to bending angles of 30, 40, 50, 60 and 70 degrees respectively. The bending angle and running time are determined on a basis of where the sample comes to rupture. If the sample does not come to rupture during the above operation, the test is further performed under conditions using a bending angle of 80° and cycling at 850 times per minute until the rupture occurs.

Adhesion in accordance with this invention is determined as follows: The test piece of rubber block is prepared by embedding a cord comprising two-ply cabled coated yarn having a length of 1 cm in the rubber block and vulcanizing it for 40 minutes at 140° C. Adhesion is estimated by the load required to pull the sample yarn out of the block.

The composition of the rubber compounds is:

| Ingredient | Parts (by weight) |
|---|---|
| Natural Rubber | 70 |
| Styrene-butadiene rubber | 30 |
| Carbon black (SRF) | 40 |
| Stearic acid | 2 |
| Zinc oxide | 5 |
| Process oil (naphthene) | 3 |
| Dibenzothiazyl disulfide | 2.5 |
| Sulfur | 2 |

According to this invention, RFL coated multi-filament carbon yarns having a tenacity of not less than about 7 grams per denier, not less than about 8 grams per denier, and also more than 10 grams per denier are provided.

According to this invention, an RFL coated multi-filament carbon yarn is provided, having a high tenacity, such as above mentioned, and having a fatigue resistance of more than 40% in the strength retention of compressed bending fatigue test, or having a fatigue resistance of more than 15.5 kilocycles at an angle of 50°, more than 15.5 kilocyles at an angle of 60° and also more than 25.5 kilocycles at an angle of 70° in the extension and compression fatigue life test.

According to this invention the cord comprises at least two strands twisted together, the individual strand being prepared from the reinforcing yarn of this invention. It is preferable that the twist factor of the cord be in the range of from about 100 to about 800, for attaining good properties in the reinforcing yarn of this invention.

The yarns or cords of this invention are suitable, for example, for reinforcing rubber articles such as tires, V-belts, conveyor belts, timing belts, hoses and the like.

The reinforcing yarns or cords of this invention are particularly suitable for reinforcing a belt portion, or for forming a bead core of a pneumatic tire.

The following examples are illustrative of the invention:

EXAMPLES E1 – E4 -and- COMPARATIVE EXAMPLES C1 – C4

These examples illustrate the effectiveness of construction of original multi-filament carbon yarns in increasing the tenacity of RFL coated multi-filament carbon yarns.

In these examples, each original multi-filament carbon yarn is prepared from TORAYCA TYPE-300 carbon yarn (supplied by Toray Industries, Inc.), having a tenacity of 18 grams per denier per individual filament. Construction of each of the original multi-filament yarns are stated in Table II together with total denier, denier per filament and twist factor.

Each original multi-filament yarn except in Comparative Example No. C4 is impregnated with a liquid containing RFL having the formula shown in Table I, and the pick-up weight of RFL is adjusted as shown in Table II.

TABLE I

| Ingredient | Parts by Weight | Dry |
|---|---|---|
| Resorcinol | 8.5 | 8.5 |
| Formaline (37%) | 4.1 | 1.5 |
| Vinylpyridine-styrene-butadiene terpolymer latex (40%) | 46.8 | 18.7 |
| Styrene-butadiene copolymer (40%) | 15.6 | 6.3 |
| Water | 25.0 | — |
| TOTAL | 100.0 | 35.0 |

The product was matured for 7 days at room temperature. Its solid content was 35% by weight.

In Comparative Example No. C4, the original multi-filament yarn was impregnated with a liquid prepared by diluting the compound given in Table I with water to a solid content of 17.5%.

Each impregnant was dried by heating to 150° C in air for 2 minutes and baked by heating to 200° C in air for 1 minute. The results are shown in Table II.

TABLE II

| Example No. | Total Denier of yarn | Denier per fil. | Twist Factor | RFL Pick-up (%) | Tenacity of the RFL coated yarn (g/d) |
|---|---|---|---|---|---|
| E 1 | 900 | 0.6 | 45 | 25 | 9.4 |
| E 2 | 1800 | 0.6 | 64 | 20 | 7.4 |
| E 3 | 3600 | 0.6 | 90 | 17 | 7.1 |
| C 1 | 4500 | 0.6 | 100 | 13 | 5.8 |
| E 4 | 1800 | 1.8 | 64 | 21 | 7.0 |
| C 2 | 1800 | 0.3 | 64 | 9.8 | 6.5 |
| C 3 | 1800 | 0.6 | 297 | 15 | 5.5 |
| C 4 | 1800 | 0.6 | 64 | 9.6 | 5.2 |

EXAMPLES E5 – E9 -and- COMPARATIVE EXAMPLES C5 –C7

These examples illustrate the effectiveness of epoxy resin treatment in increasing adhesion of RFL coated multi-filament carbon yarn to rubber.

In these examples, each original multi-filament carbon yarn having a total denier of 1,800, a filaments number of 3,000 and a twist factor of 64 was prepared from the multi-filament carbon yarn "TORAYCA" TYPE-300, having a single filament tenacity of 18 grams per denier.

Each original multi-filament yarn was impregnated with a liquid containing an epoxy resin having the formulation given in Table III.

TABLE III

| Ingredient | Parts by weight |
|---|---|
| Epoxy resin "EPIKOTE 834" derived from bisphenol A and epichlorohydrine | 15 |
| Toluene | 100 |

Each impregnant was dried and cured by heating to 100° C in air for 5 minutes. Each multi-filament carbon yarn was coated with the epoxy resin having a weight equivalent to 3% by weight of the multi-filament yarn alone.

In Example No. E8, the epoxy coated multi-filament yarn was impregnated with a liquid formulated in Table IV.

TABLE IV

| Ingredient | Parts by weight |
|---|---|
| Resorcinol | 8.5 |
| Formalin (37%) | 4.1 |
| Vinylpyridine-styrene-butadiene terpolymer latex (40%) | 62.6 |
| Water | 24.6 |

The product was matured for 7 days at 20° C.

In Examples E5 – E7 and E9, each epoxy coated multi-filament yarn was impregnated with a liquid prepared in proportion to the liquid given in Table IV referring to the R/F molar ratio and RF/L weight ratio stated in Table V.

Each impregnant was dried and cured by heating to 220° C in air for 1 minute. The results are shown in Table V.

TABLE V

| No. | R F L R/F (molar ratio) | RF/L (weight ratio) | Pick up (%) | Adhesion (kg/cm) |
|---|---|---|---|---|
| E 5 | 1.0/2.0 | 1/80 | 20.7 | 8.6 |
| E 6 | 1.0/2.0 | 1/10.0 | 23.1 | 8.1 |
| E 7 | 1.0/2.0 | 1/15.0 | 28.5 | 7.1 |
| E 8 | 1.5/1.0 | 1/2.5 | 15.1 | 10.3 |
| E 9 | 1.5/1.0 | 1/5.0 | 18.2 | 8.3 |
| C 5 | — | L=100% | 18.3 | 5.3 |
| C 6 | — | — | 0 | 1.5 |
| C 7 | 1.5/1.0 | 1/2.5 | 15.4 | 1.5 |

NOTE:
R = Resorcinol,
F = formaldehyde,
RF = Condensate of resorcinol and formaldehyde and
L = rubber latex In Table V, Comparative Example No. C5 shows that the epoxy resin coated multi-filament yarn was impregnated with only a rubber latex; Comparative Example No. C6 shows that the original multi-filament yarn was treated with epoxy resin only; Comparative Example C7 shows that the original multi-filament yarn was coated directly with only the liquid containing RFL shown in Tables IV and V without any epoxy resin treatment.

EXAMPLES E 10 –E- 12 -and- COMPARATIVE EXAMPLES C 8 - C 9

These examples illustrate the effectiveness of a water soluble epoxy resin in increasing adhesion of RFL coated multi-filament carbon yarn to rubber, and its effectiveness in improving its fatigue resistance as well.

In these examples, each original multi-filament carbon yarn having a total denier of 1,800. a filament count of 3,000 and a twist factor of 64 was prepared from a multi-filament carbon yarn "TORAYCA" TYPE-300 having a tenacity of 18 grams per denier (single filament).

In Examples Nos. E10, E11, E12 and Comparative Example C8, each original multi-filament carbon yarn was impregnated with liquids A, B, C and D having the following formulations respectively, and pick up was adjusted as shown in Table VII.

Liquid A: An aqueous solution of 5% of glycerol polyglycidyl ether (branded "DENACOL EX 313" supplied by NAGASESANGYO, having a weight (epoxy equivalent) of 135).

Liquid B: An aqueous solution of 5% of polyethylene glycol diglycidyl ether (branded "DENACOL EX 821" supplied by NAGASESANGYO, having a weight (epoxy equivalent) of 195).

Liquid C: An aqueous solution of 5% of pentaerythritol polyglycidyl ether (branded "DENACOL EX 411" supplied by NAGASESANGYO, having a weight (epoxy equivalent) of 180).

Liquid D: An emulsion dispersion compound consisting of a toluene solution of 50% epoxy resin derived from bisphenol A and epichlorohydrine (branded "EPIKOTE 834" supplied by SHELL CHEMICAL) together with an added non-ionic surface active agent and also water in an amount of 10 times by volume. The epoxy resin used here was not water soluble.

Each impregnant was dried and cured by heating to 200° C in air for 2 minutes.

After that, each epoxy coated multi-filament yarn was impregnated with a liquid as fomulated in Table VI which follows.

TABLE VI

| Ingredient | Parts by weight |
|---|---|
| Resorcinol | 11 |
| Formalin (37%) | 8 |
| Vinylpyridine-styrene-butadiene terpolymer latex (40%) | 100 |
| Water | 36 |

The product was matured for 7 days at 20° C.

Each impregnant was dried and cured by heating to 220° C in air for 1 minute. The results are shown in Table VII which follows.

TABLE VII

| NO. | Liquid Containing epoxy resin | Epoxy resin pick up (%) | RFL pick up (%) | Tenacity (g/d) | Adhesion (kg/cm) | Strength retention of compression flexing (%) | Extension compression fatigue life (bending angle°, life kilocycles) |
|---|---|---|---|---|---|---|---|
| E 10 | A | 2.0 | 63 | 12.3 | 18 | 61 | 80° 323 kc |
| E 11 | B | 1.9 | 56 | 10.7 | 19 | 57 | 80° 213 kc |
| E 12 | C | 2.5 | 47 | 10.1 | 18 | 51 | 80° 145 kc |
| C 8 | D | 1.1 | 18 | 7.1 | 13 | ruptured | 30° 17 kc |

TABLE VII-continued

| NO. | Liquid Containing epoxy resin | Epoxy resin pick up (%) | RFL pick up (%) | Tenacity (g/d) | Adhesion (kg/cm) | Strength retention of compression flexing (%) | Extension compression fatigue life (bending angle°, life kilocycles) |
| --- | --- | --- | --- | --- | --- | --- | --- |
| C 9 | — | — | 19 | 7.3 | 3 | ruptured | 30° 8.5 kc |

In Table VII, Comparative Example No. C8 shows the case of the epoxy resin being not water soluble and Comparative Example No. C9 shows the case of the original multi-filament yarn coated with only RFL and without epoxy resin treatment.

EXAMPLES E 13 – E 17

These examples illustrate the effect of pick up weight of RFL on and into the multi-filament yarn, upon tenacity, adhesion and fatigue resistance of RFL coated multi-filament carbon yarns.

In Examples E13 – E17, each original multi-filament carbon yarn and each epoxy resin coated multi-filament carbon yarn were prepared the same as in Example No. E10.

Each epoxy resin coated multi-filament yarn was impregnated with a liquid containing RFL as shown in Table VIII. The pick up weight of the RFL was adjusted as shown in Table VIII by adjusting the concentration of RFL in the liquid.

TABLE VIII

| NO. | RFL pick up (%) | Tenacity (g/d) | Adhesion (kg/cm) | Extension Compression fatigue life (bending angle°, kc) |
| --- | --- | --- | --- | --- |
| E 13 | 20 | 8.3 | 16 | 30° 18 kc |
| E 14 | 28 | 9.0 | 17 | 30° 25 kc |
| E 15 | 41 | 10.5 | 18 | 80° 130 kc |
| E 16 | 56 | 11.7 | 19 | 80° 319 kc |
| E 17 | 63 | 12.3 | 18 | 80° 323 kc |

EXAMPLES E 18 – E 21 -and- COMPARATIVE EXAMPLES C 10 – C 12

These examples illustrate the effectiveness of total denier and twist factor of the original multi-filament carbon yarn upon tenacity and fatigue resistance of the RFL coated yarn.

In these examples, each original was constructed as shown in Table IX with denier per filament, total denier and twist factor. The original multi-filament yarn was prepared from a carbon fiber "TORAYCA" TYPE-300 having a tenacity of 18 grams per denier per filament.

Each original multi-filament yarn was treated with an epoxy resin and coated with RFL in the same manner described in Example E10. The results are given in Table IX.

TABLE IX

| NO. | Denier per filament | Total Denier | Twist Factor | Epoxy resin pick up (%) | RFL pick up (%) | Tenacity (g/d) | Adhesion (kg/cm) | Strength Retention of compression flexing (%) | Extension Compression fatigue life (bending angle °, kc) |
| --- | --- | --- | --- | --- | --- | --- | --- | --- | --- |
| E 18 | 0.42 | 2520 | 25 | 2.6 | 48 | 8.9 | 24 | 48 | 80° 18 kc |
| E 19 | 1.8 | 1800 | 21 | 2.5 | 50 | 8.1 | 17 | 62 | 80° 14 kc |
| E 20 | 0.6 | 3600 | 30 | 2.1 | 43 | 8.4 | 25 | 50 | 80° 12 kc |
| C 10 | 0.6 | 4500 | 34 | 0.9 | 30 | 7.4 | 16 | 18 | 30° 20 kc |
| E 21 | 0.6 | 1800 | 170 | 1.8 | 41 | 9.3 | 17 | 48 | 80° 51 kc |
| C 11 | 0.6 | 1800 | 297 | 0.4 | 22 | 6.0 | 16 | 17 | 30° 17 kc |
| C 12 | 0.6 | 1800 | 1000 | 0.4 | 18 | 1.8 | 4 | ruptured | 20° 8.5 kc |

EXAMPLES E 22 – E 23 -and- COMPARATIVE EXAMPLES C 13 – C 14

These examples illustrate the effect of pick up weight of epoxy resin upon adhesion and fatigue resistance of RFL coated multi-filament carbon yarns.

In these examples, each orignal multi-filament yarn was treated with epoxy resin and coated with RFL the same as in Example No. E10, except that the concentration of epoxy resin in the liquid was changed and the press condition for adjusting the pick up weight of epoxy resin was adjusted as shown in Table X. The results are shown in Table X.

TABLE X

| NO. | Epoxy resin pick up (%) | RFL pick up (%) | Tenacity (g/d) | Adhesion (kg/cm) | Strength retention of compression flexing (%) | Extension compression fatigue life (bending angle, mark of degree kc) |
| --- | --- | --- | --- | --- | --- | --- |
| C 13 | 0.2 | 25 | 8.4 | 16 | ruptured | 30 ° 17 kc |
| E 22 | 1.0 | 47 | 10.3 | 19 | 58 | 80 ° 153 kc |
| E 23 | 3.8 | 41 | 10.3 | 18 | 55 | 80 ° 85 kc |
| C 14 | 11.2 | 27 | 9.0 | 14 | 20 | 30 ° 25 kc |

We claim:

1. A multi-filament reinforcing carbon yarn having tenacity of at least about 7 grams per denier, said reinforcing yarn being encapsulated by a resorcinol-formaldehyde-latex composition, in which the amount by weight of the resorcinol-formaldehyde-latex composition encapsulating said multi-filament yarn is equivalent at least to about 10% by weight of the multi-filament yarn, said multi-filament yarn having a denier in the range of from about 500 to 4,000 and a twist factor in the range of from 0 to about 250, wherein the twist factor is the twist in turns per 10 cm in the multi-filament yarn multiplied by the square root of the denier of the multi-filament yarn, said multi-filament yarn further comprising individual filaments having a denier in the range of from about 0.4 to 2.0 and a tenacity of at least about 10 grams per denier.

2. A yarn according to claim 1, in which the multi-filament yarn is encapsulated by an epoxy resin, and in which the equivalent amount of the epoxy resin encapsulating the multi-filament yarn is in the range of from about 0.5% to 10% by weight of the multi-filament yarn.

3. A yarn according to claim 2 in which the epoxy resin is a water soluble epoxy resin.

4. A yarn according to claim 1 in which the amount by weight of the resorcinol-formaldehyde-latex composition is at least about 40%.

5. A carbon filament reinforcing cord which comprises at least two strands of yarn twisted together, at least one of said strands being prepared from a multi-filament reinforcing carbon yarn, said multi-filament reinforcing carbon yarn having tenacity of at least about 7 grams per denier, and encapsulated by a resorcinol-formaldehyde-latex composition, the amount by weight of the resorcinol-formaldehyde-latex composition encapsulating the multi-filament yarn being equivalent at least to about 10% by weight of the multi-filament yarn, said multi-filament yarn having a denier in the range of from about 500 to 4,000 and a twist factor in the range of from 0 to about 250, wherein said twist factor is the twist in turns per 10 cm in the multi-filament yarn multiplied by the square root of the denier of said multi-filament yarn, individual filaments of said multi-filament yarn having a denier in the range of from about 0.4 to 2.0 and a tenacity of at least about 10 grams per denier.

6. A reinforcing cord which comprises at least two strands twisted together, an individual strand being prepared from a multi-filament reinforcing carbon yarn, said multi-filament reinforcing carbon yarn having a tenacity of at least about 7 grams per denier and coated with a resorcinol-formaldehyde-latex composition, the amount by weight of said resorcinol-formaldehyde-latex composition being equivalent at least to about 10% by weight of said multi-filament reinforcing carbon yarn, said multi-filament reinforcing carbon yarn having a denier in the range of from about 500 to about 4,000, and a twist factor in the range of from 0 to about 250, wherein said twist factor is the twist in turns per 10 cm in the multi-filament reinforcing carbon yarn multiplied by the square root of the denier of said yarn, individual filaments of said yarn having a denier in the range of from about 0.4 to 2.0 and a tenacity of at least about 10 grams per denier, and wherein the twist factor of the cord is in the range of from about 100 to about 800, wherein said twist factor of said cord is defined as the twist in turns per 10 cm in said cord multiplied by the square root of the denier of said cord.

7. A multi-filament carbon yarn for preparing a reinforcing yarn, having a plurality of individual filaments having a tenacity of at least about 10 grams per denier, the multi-filament yarn having a denier in the range of from about 500 to about 4,000, said filaments having a denier per filament in the range of from about 0.4 to 2.0, said multi-filament yarn having a twist factor in the range of from 0 to about 250 where the twist factor is defined as the twist in turns per 10 cm length of the multi-filament yarn multiplied by the square root of the denier of the multi-filament yarn, the individual filaments being coated with an epoxy resin and the multi-filament yarn being encapsulated by the epoxy resin, the equivalent amount of the epoxy resin encapsulating the multi-filament yarn being in the range of from 0.5% to 10% by weight of the multi-filament yarn.

8. A method for manufacture of carbon multi-filament reinforcing yarn having a tenacity of at least about 7 grams per denier, which method comprises:
  a. impregnating a multi-filament carbon yarn with a liquid medium containing a resorcinol-formaldehyde-latex composition,
  b. adjusting the amount of pick-up of the liquid so that after subsequently being dried, the amount by weight of the resorcinol-formaldehyde-latex composition encapsulating the multi-filament yarn becomes equivalent to at least about 10% by weight of the multi-filament yarn, and
  c. drying the product to encapsulate the multi-filament yarn with the solidified resorcinol-formaldehyde-latex composition, the multi-filament carbon yarn having a denier in the range of from about 500 to about 4,000, a twist factor in the range of from 0 to about 250, an individual filament tenacity of at least about 10 grams per denier and a denier per filament in the range of from 0.4 to 2.0.

9. A method according to claim 8 in which prior to being subjected to said impregnation the multi-filament carbon yarn is subjected to the following steps:
  a. impregnating the yarn with a liquid medium containing an epoxy resin,
  b. adjusting the amount of pick-up of the liquid so that after subsequently being dried, the amount by weight of the epoxy resin encapsulating the yarn becomes equivalent to about 0.5% to 10% by weight of the yarn and
  c. drying the yarn to encapsulate the yarn with the epoxy resin.

10. A method according to claim 9 in which the amount by weight of the epoxy resin is in the range of from 1% to 6% based upon the weight of the yarn.

11. A method according to claim 9 in which the amount by weight of the resorcinol-formaldehyde-latex composition is in the range of from 10% to 50%, based upon the weight of the yarn.

12. A method according to claim 9 in which the epoxy resin is water soluble.

13. A method according to claim 12 in which the amount by weight of the resorcinol-formaldehyde-latex composition is at least about 40%, based upon the weight of the yarn.

* * * * *